United States Patent
Coulmeau et al.

(10) Patent No.: US 8,340,843 B2
(45) Date of Patent: Dec. 25, 2012

(54) METHOD FOR DETERMINING THE SPEED OF AN AIRCRAFT

(75) Inventors: François Coulmeau, Seilh (FR); Manuel Gutierrez-Castaneda, Toulouse (FR); Nicolas Simi, Lavernos Lacasse (FR); Xavier Blanchon, Toulouse (FR)

(73) Assignee: Thales, Neuilly sur Seine (FR)

( * ) Notice: Subject to any disclaimer, the term of this patent is extended or adjusted under 35 U.S.C. 154(b) by 366 days.

(21) Appl. No.: 12/613,203

(22) Filed: Nov. 5, 2009

(65) Prior Publication Data

US 2010/0152930 A1   Jun. 17, 2010

(30) Foreign Application Priority Data

Nov. 7, 2008 (FR) .................................. 08 06232

(51) Int. Cl.
G06F 7/00 (2006.01)
(52) U.S. Cl. ...................... 701/14; 701/4; 701/7; 701/8
(58) Field of Classification Search .............. 701/4, 7–8, 701/14
See application file for complete search history.

(56) References Cited

U.S. PATENT DOCUMENTS

| | | | |
|---|---|---|---|
| 4,774,670 A | 9/1988 | Palmieri | |
| 5,051,910 A | 9/1991 | Liden | |
| 5,121,325 A | 6/1992 | DeJonge | |
| 6,507,739 B1 * | 1/2003 | Gross et al. | 455/431 |
| 6,507,782 B1 | 1/2003 | Rumbo et al. | |
| 6,522,958 B1 * | 2/2003 | Dwyer et al. | 701/3 |
| 6,922,631 B1 * | 7/2005 | Dwyer et al. | 701/206 |
| 7,676,303 B2 * | 3/2010 | Hanel | 701/3 |
| 7,711,457 B2 * | 5/2010 | Caillaud | 701/5 |
| 7,835,825 B2 * | 11/2010 | Coulmeau et al. | 701/3 |
| 7,945,354 B2 * | 5/2011 | Boorman et al. | 701/3 |
| 2007/0100538 A1 | 5/2007 | Wise et al. | |
| 2007/0179703 A1 * | 8/2007 | Soussiel et al. | 701/200 |
| 2008/0039984 A1 * | 2/2008 | Bitar et al. | 701/3 |
| 2008/0300738 A1 | 12/2008 | Coulmeau et al. | |
| 2008/0306638 A1 | 12/2008 | Gutierrez-Castaneda et al. | |
| 2008/0312776 A1 * | 12/2008 | Sylvester | 701/3 |
| 2008/0312779 A1 | 12/2008 | Sacle et al. | |
| 2009/0082955 A1 | 3/2009 | Sacle et al. | |

* cited by examiner

Primary Examiner — Hussein A. Elchanti
(74) Attorney, Agent, or Firm — LaRiviere, Grubman & Payne, LLP

(57) ABSTRACT

The invention relates to a method for determining the speed of an aircraft that is subject to a time constraint. The invention consists no longer in calculating a single CAS/MACH pair during climb/descent but in adapting the speed in a continuous manner to the bounds of curves of minimum $V_{min}$ and maximum $V_{max}$ speed defining a flight envelope of the aircraft. The calculation of these speeds is carried out on the basis of constant maximum and minimum speed setpoints and of a coefficient taking into account a deviation to the time constraint.

15 Claims, 7 Drawing Sheets

METHOD FOR DETERMINING THE SPEED OF AN AIRCRAFT

PRIORITY CLAIM

This application is a Continuation in Part of Application Publication No. 2008/0300738, filed May 30, 2008 which claims priority to French Patent Application Number 07 03912 filed Jun. 1, 2007. This application also claims priority to French Patent Application Number 08 06232, entitled Method for Determining the Speed of an Aircraft, filed on Nov. 7, 2008.

TECHNICAL FIELD

The invention relates to the determination of the speed of an aircraft that is subject to a time constraint.

BACKGROUND OF THE INVENTION

For a few years, thoughts have turned to the increase in traffic and the ensuing loading of air traffic controllers. In order to guarantee the safety and also the economic viability of air transport, it is envisaged, notably in the approach phase, that a time constraint be imposed on a particular waypoint: runway threshold, Initial Approach Fix (IAF), or rallying point for final approach, termed the ATC Merge Point.

This allows the air traffic control to guarantee a smoothed flow in the approach, and to manage a stable number of aeroplanes corresponding to the capabilities of the ground facilities and to the limit loading of an air traffic controller.

These time constraints can also serve in other operational contexts such as the management of the number of aeroplanes per sector.

Aboard the aircraft, the time constraint is in general inserted into a flight management computer termed the FMS (the acronym standing for Flight Management System). A flight management system consists of various functional hardware components which allow the crew to programme a flight using a navigation database. The system calculates a lateral and vertical trajectory making it possible to reach the destination of the flight plan. These calculations are based on the characteristics of the aeroplane and data provided by the crew and the environment of the system. The positioning and guidance functions collaborate to aid the aircraft to remain on this trajectory.

The pilot can programme the meeting of a time constraint, termed RTA for Required Time Arrival, at a point of the flight plan on the request of air traffic control for example. In this case the FMS performs an optimization of the trajectory by successive iterations so as to comply with the constraint.

To comply with an RTA, the FMS calculates predictions to determine the speed strategy. Once the strategy has been chosen, a re-calculation will take place if the prediction for the time of transit at the constrained point, termed the ETA for Estimated Time of Arrival, departs from a predetermined tolerance.

However the speed of an aircraft is confined within a speed envelope defined by two speed profiles: a maximum speed profile and a minimum speed profile. They depend mainly on the weight and the altitude of the aircraft. The maximum speed also depends on the ambient temperature. Other parameters can also come into play depending on the type of aircraft. FIG. 1 represents a typical evolution of the limit values of a flight envelope 11 for a given altitude and temperature as a function of the aircraft weight. The abscissa axis represents the weights decreasing towards the right, the ordinate axis the speeds. It is noted that the minimum speed $V_{MIN}$ increases with the weight of the aircraft, while its maximum speed $V_{MAX}$ decreases onwards of a certain threshold.

In the flight management systems according to the known art, the speeds are expressed in a speed unit called CAS, the acronym standing for Calibrated AirSpeed, or in MACH. Nevertheless, the meeting of a time constraint is dependent on the ground speed or GS. The ground speed is the horizontal component of the speed relative to the ground; it is determined by the sum of the air speed and of the wind. FIG. 2 represents the variation of the air speed as a function of altitude for a given speed expressed in terms of CAS or MACH. It may be noted that for a constant value of CAS, the air speed (and therefore the ground speed) increases with altitude. For a constant value of MACH, the ground speed decreases with altitude. Speed alterations are made rather in terms of CAS at low altitude and in terms of MACH at high altitude.

In the flight management systems according to the known art, the speed setpoints are limited to: a CAS/MACH pair for the aircraft climb phase, a few MACH speed values for its cruising phase and a CAS/MACH pair for the descent phase.

The setpoint CAS and MACH are dependent on an economic optimization criterion termed CI for Cost Index, weight, altitude, and temperature.

The Cost Index is in fact a criterion for optimizing between the time costs CT ("Cost of Time") and the fuel costs CF ("Cost of Fuel"). The Cost Index is defined by CI=CT/CF. The value of this cost index for an aircraft and a given mission is determined according to criteria specific to each operator, and constrains notably the rules for determining the altitudes and speeds of the flight plan (vertical profile of the flight plan).

The maximum speeds (CAS or Mach) may be dependent on the weight and the altitude on certain aircraft, as is the case for FIG. 1. FIG. 2 presents a curve of minimum speed Vmin 201 and a curve of maximum speed Vmax 202 corresponding to a case of initial weight denoted GW0, and integrating the lightening of the weight of the aircraft. The minimum speeds (CAS or Mach) take account of the stall speeds with a margin. These minimum speeds are dependent notably on the weight, altitude and temperature.

The CAS and MACH setpoints, calculated with the schemes according to the known art, are limited by the envelope. Each of these limits is calculated for a single point of the envelope. For the climb phase or the descent phase, it may happen that the flight envelope at the top or at the bottom is more limiting than the flight envelope during the phase.

Several schemes according to the known art make it possible to control the 4D trajectory of the aircraft so as to make it comply with a time constraint. These schemes all perform a convergence in speed, in open loop: the 4D trajectory is reoptimized at regular intervals but is not regulated. These schemes are generally based on a variation of the Cost Index.

A flight management system making it possible to comply with a time constraint by varying a cost index "Cost Index" is known through U.S. Pat. No. 5,457,634. Such a system makes it possible notably to calculate an optimal cruising altitude so as to economize on fuel consumption. One of the drawbacks of such a system arises when a time constraint cannot be complied with. The system can then signal that the constraint is deficient though the latter could be complied with by adopting a flight speed closer to the limits of the flight envelope.

The invention is aimed at alleviating the problems cited previously by proposing a method for calculating a speed making it possible to comply with a time constraint RTA. The invention consists no longer in calculating a single CAS/

MACH pair during climb/descent but in adapting the speed in a continuous manner to the bounds of the curves of minimum Vmin and maximum Vmax speeds when a time constraint may not be achieved by following a single CAS/MACH pair.

SUMMARY OF THE INVENTION

For this purpose, the subject of the invention is a method for determining the speed of an aircraft that is subject to a time constraint RTA expressed in the form of a fixed date at a determined point, the said aircraft exhibiting a limit speed profile $V_{limit}$, the said aircraft comprising a flight management system calculating a predicted time of arrival ETA of the aircraft at the said point on following a speed setpoint expressed in the form of a pair of constant speeds CAS, MACH, the flight management system calculating, furthermore, a first arrival time $ETA_1$ of the aircraft at the said point on following a pair of constant limit speeds $CAS_{limit}$, $MACH_{limit}$, the aircraft following the first speed of the pair $CAS_{limit}$ when the aircraft flies at an altitude below a predefined altitude $Alt_{Max}$, the said method being characterized in that it comprises:

the calculation of a second arrival time $ETAenv_2$ on flying according to the limit speed profile $V_{limit}$,
if the time constraint RTA lies between the first arrival time $ETA_1$ and the second arrival time $ETAenv_2$:
the calculation of a deviation $\Delta_{ETA}$ to the time constraint: $\Delta_{ETA}=|ETA-RTA|$, the said deviation to the time constraint $\Delta_{ETA}$ being equal to the absolute value of the difference between the predicted arrival time ETA of the aircraft at the said point on following a speed setpoint and the time constraint RTA,
the calculation of a first speed profile $CAS(alt_1)$ dependent on an altitude on the basis of the limit speed profile $V_{limit}$, with $alt_1$ being an altitude between 0 and the predefined altitude $Alt_{Max}$,
the calculation of a second speed profile $MACH(alt_2)$ dependent on an altitude, on the basis of the limit speed profile $V_{limit}$, with $alt_2$ being an altitude between the predefined altitude $Alt_{Max}$ and a cruising altitude,
the updating of the predicted arrival time ETA by taking into account the calculated first and second speed profiles $CAS(alt_1)$ and $MACH(alt_2)$,
the calculation of the deviation $\Delta_{ETA}$ to the time constraint: $\Delta_{ETA}=|ETA-RTA|$
if the deviation to the arrival time $\Delta_{ETA}$ is nonzero, the return to the step of calculating the first speed profile $CAS(alt_1)$, otherwise the application of the calculated speed profiles to the aircraft.

BRIEF DESCRIPTION OF THE DRAWINGS

According to a characteristic of the invention, the method furthermore comprises a step of calculating a coefficient C as a function of the deviation $\Delta_{ETA}$ to the time constraint and if the deviation $\Delta_{ETA}$ to the time constraint is nonzero, the return to the step of calculating the first speed profile $CAS(alt_1)$.

According to a variant of the invention, the limit speed profile $V_{limit}$ is a maximum speed profile $V_{max}$, the first arrival time $ETA_1$ being an arrival time $ETA_{Min}$ of the aircraft following a pair of constant maximum speeds $CAS_{Max}$, $MACH_{Max}$, the second arrival time $ETAenv_2$ being an arrival time $ETAenv_{Min}$ following the maximum speed profile $V_{Max}$.

According to another variant of the invention, the limit speed profile $V_{limit}$ is a minimum speed profile $V_{Min}$, the first arrival time $ETA_1$ being an arrival time $ETA_{Max}$ of the aircraft following a pair of constant minimum speeds $CAS_{Min}$, $MACH_{Min}$, the second arrival time $ETAenv_2$ being an arrival time $ETAenv_{Max}$ following the minimum speed profile $V_{Min}$.

The invention also relates to a flight management system of an aircraft comprising a module for constructing a continuous trajectory on the basis of points of a flight plan and a module of predictions for constructing a vertical profile optimized on the trajectory, characterized in that the modules of predictions and for constructing a trajectory comprise means for implementing the method according to the invention.

The method according to the invention has the advantage of restoring a time margin by making best use of the capabilities of the aircraft by approaching the limits of the flight envelope.

This method operates whatever guidance scheme is chosen: guidance by air speed or TAS for True AirSpeed or guidance by CAS/MACH after conversion.

The method performs a guidance by speed by varying the latter in a continuous manner, avoiding jumps in speed setpoint and consequently in engine thrust.

Another advantage of the use of the invention is the reduction in the stress to the crew by automatically proposing a solution maximizing the probability of meeting of an RTA and the reduction in the controller's workload, by decreasing the rate of deficient constraints.

Figure 1:
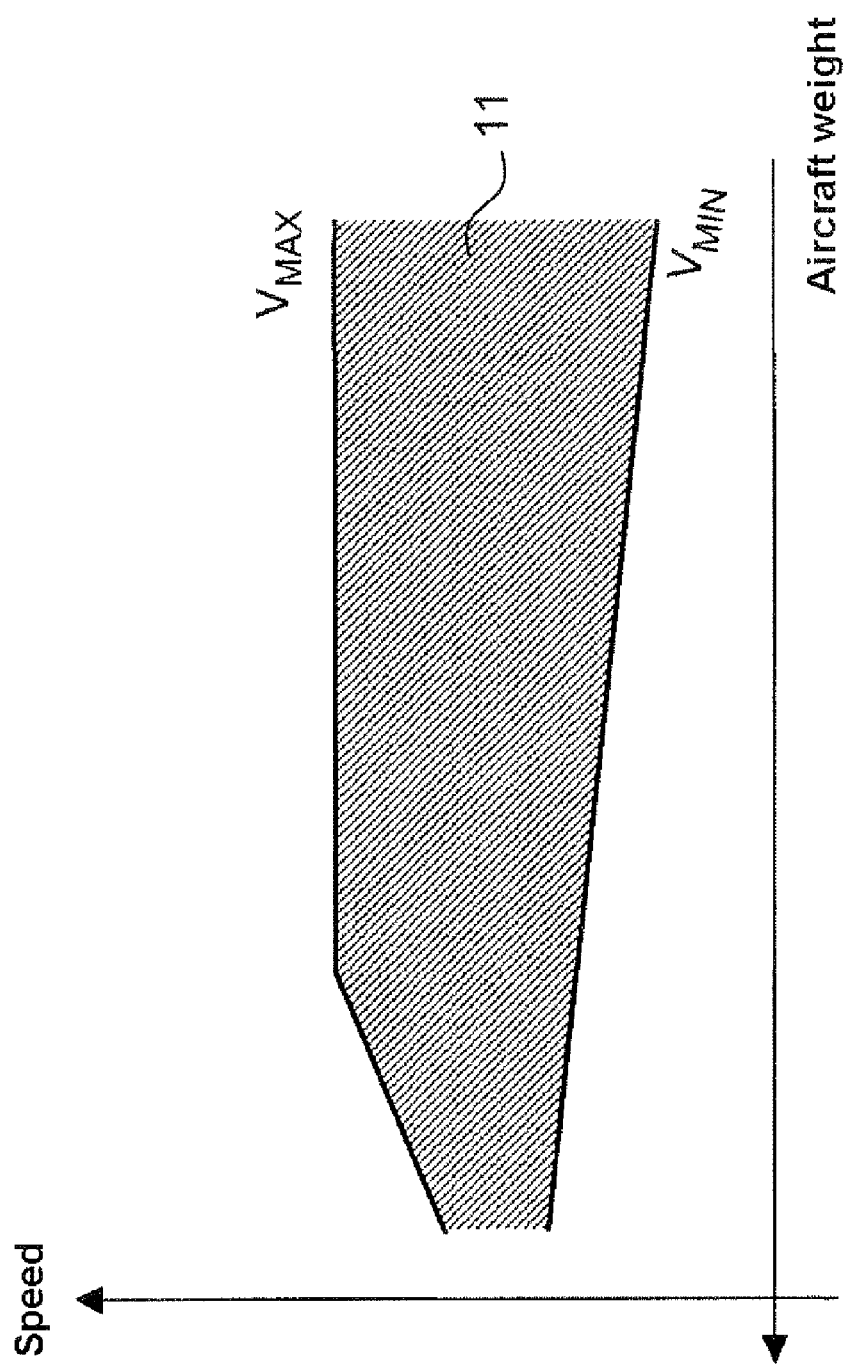

The invention will be better understood and other advantages will become apparent on reading the detailed description given by way of nonlimiting example and with the aid of the figures among which:

FIG. 1, already presented, represents an aircraft speed envelope.

Figure 2:
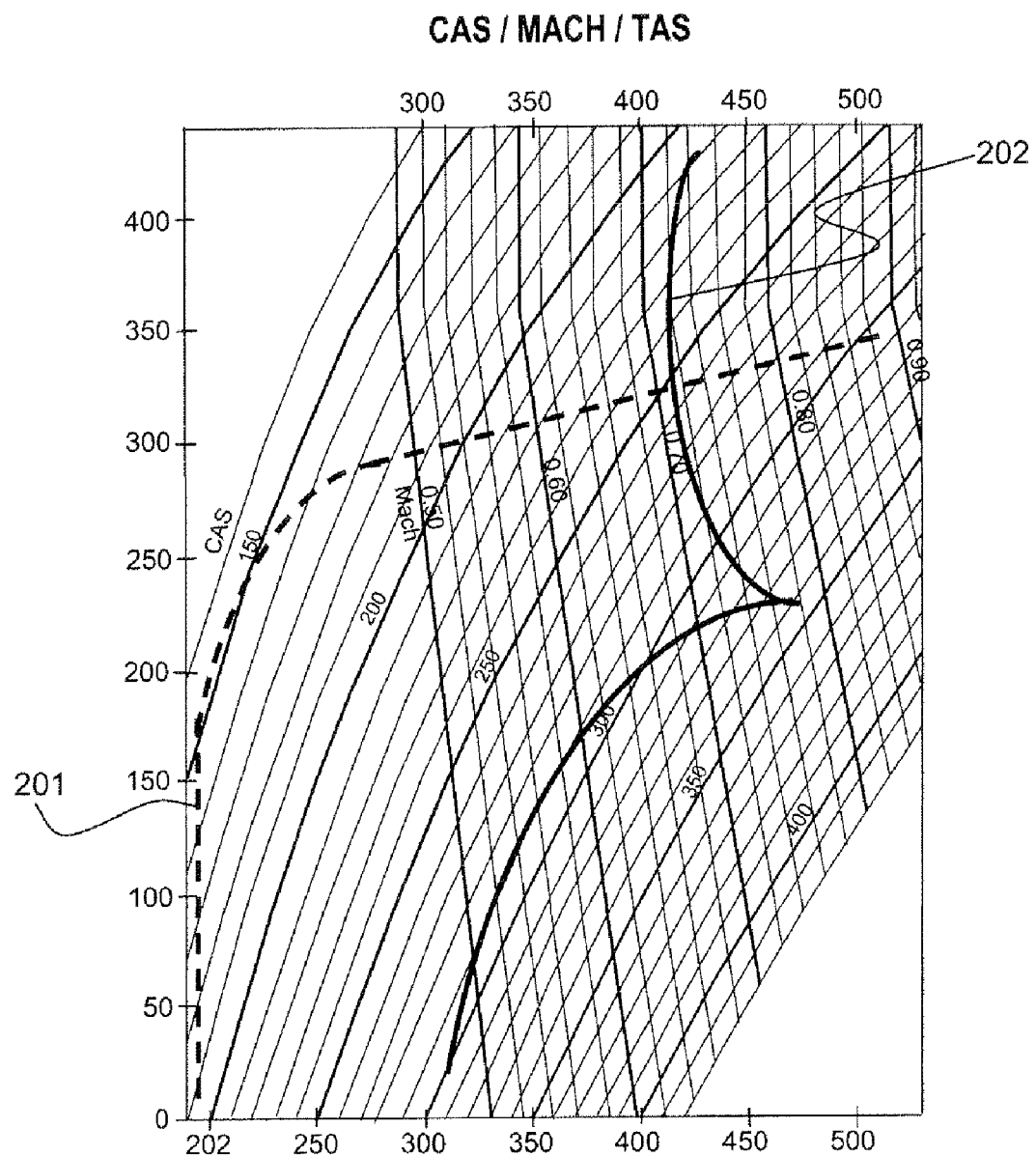

FIG. 2, already presented, represents the evolution as a function of altitude of the air speed of an aircraft for a given CAS or MACH speed.

Figure 3:
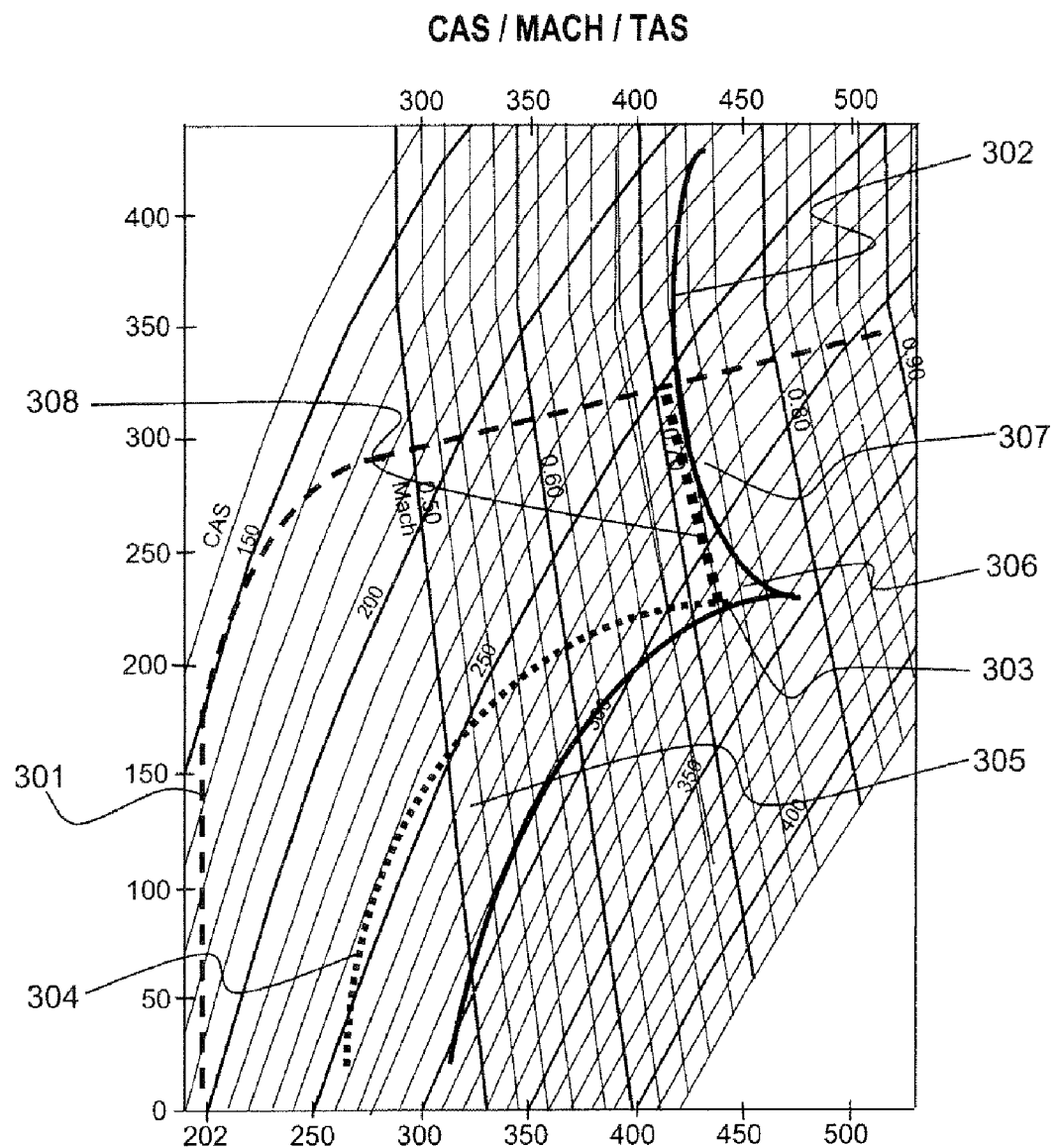

FIG. 3 represents curves of minimum and maximum air speeds of an aircraft.

Figure 4:
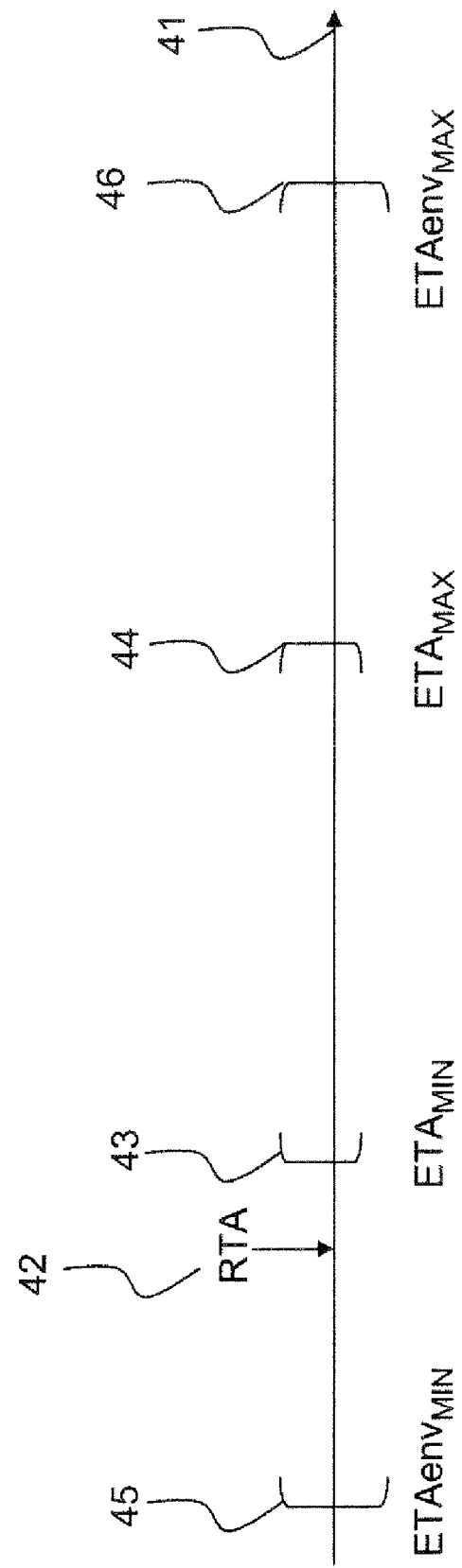

FIG. 4 represents the earliest and latest arrival times on using the method according to the invention.

Figure 5:
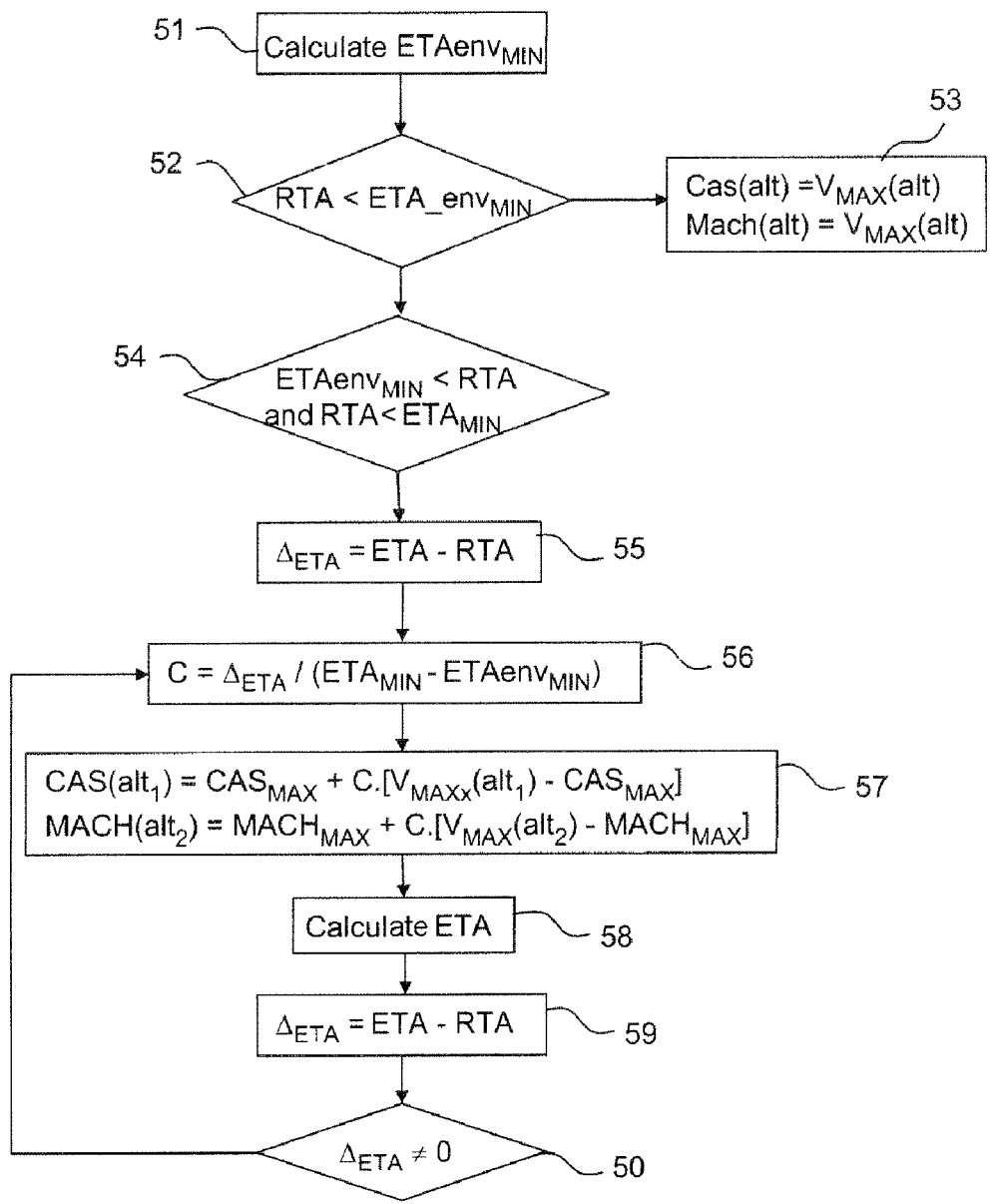

FIG. 5 illustrates the main steps of the method according to the invention in the case of a delay in a time constraint.

Figure 6:
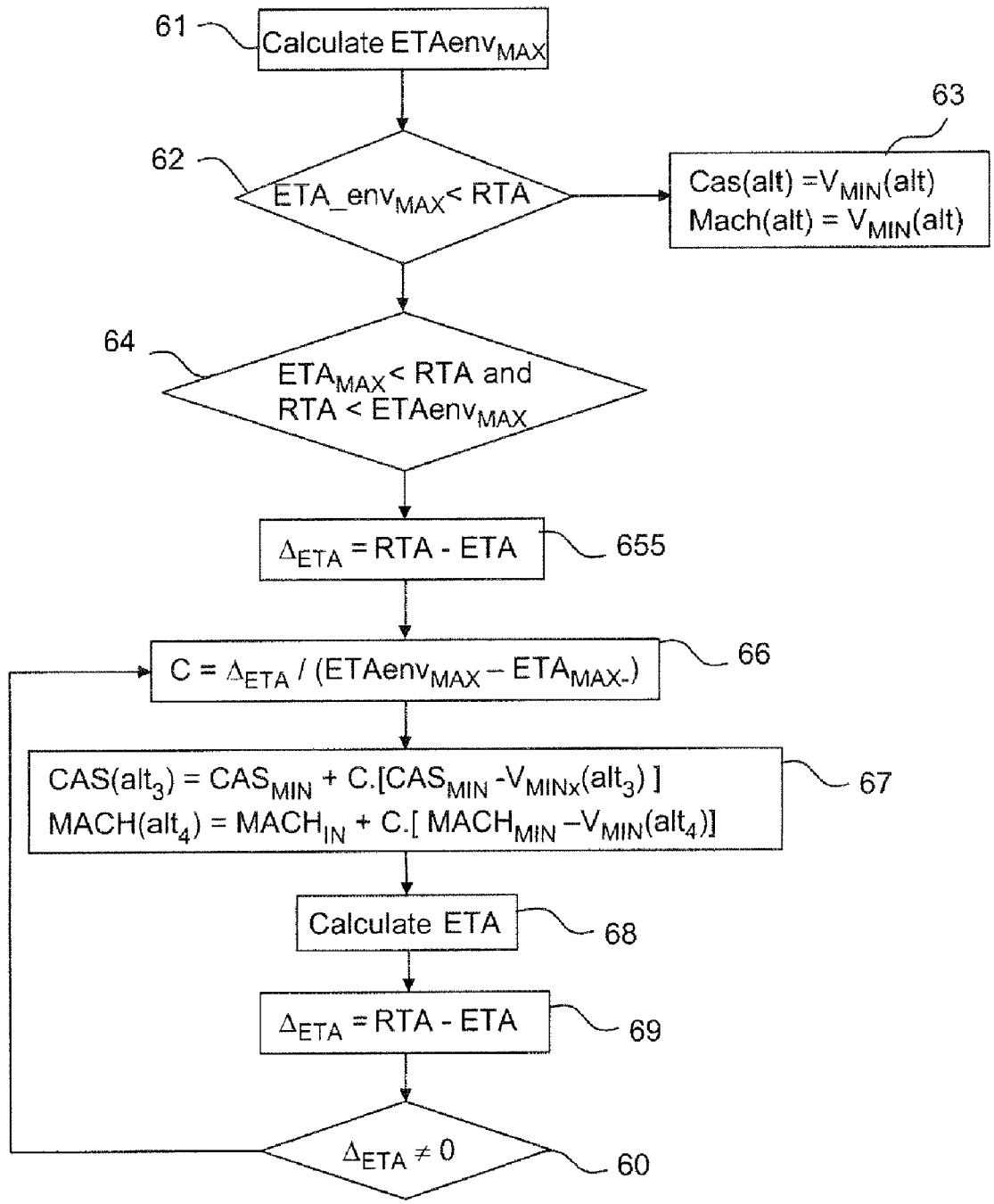

FIG. 6 illustrates the main steps of the method according to the invention in the case of an advance in a time constraint.

Figure 7:
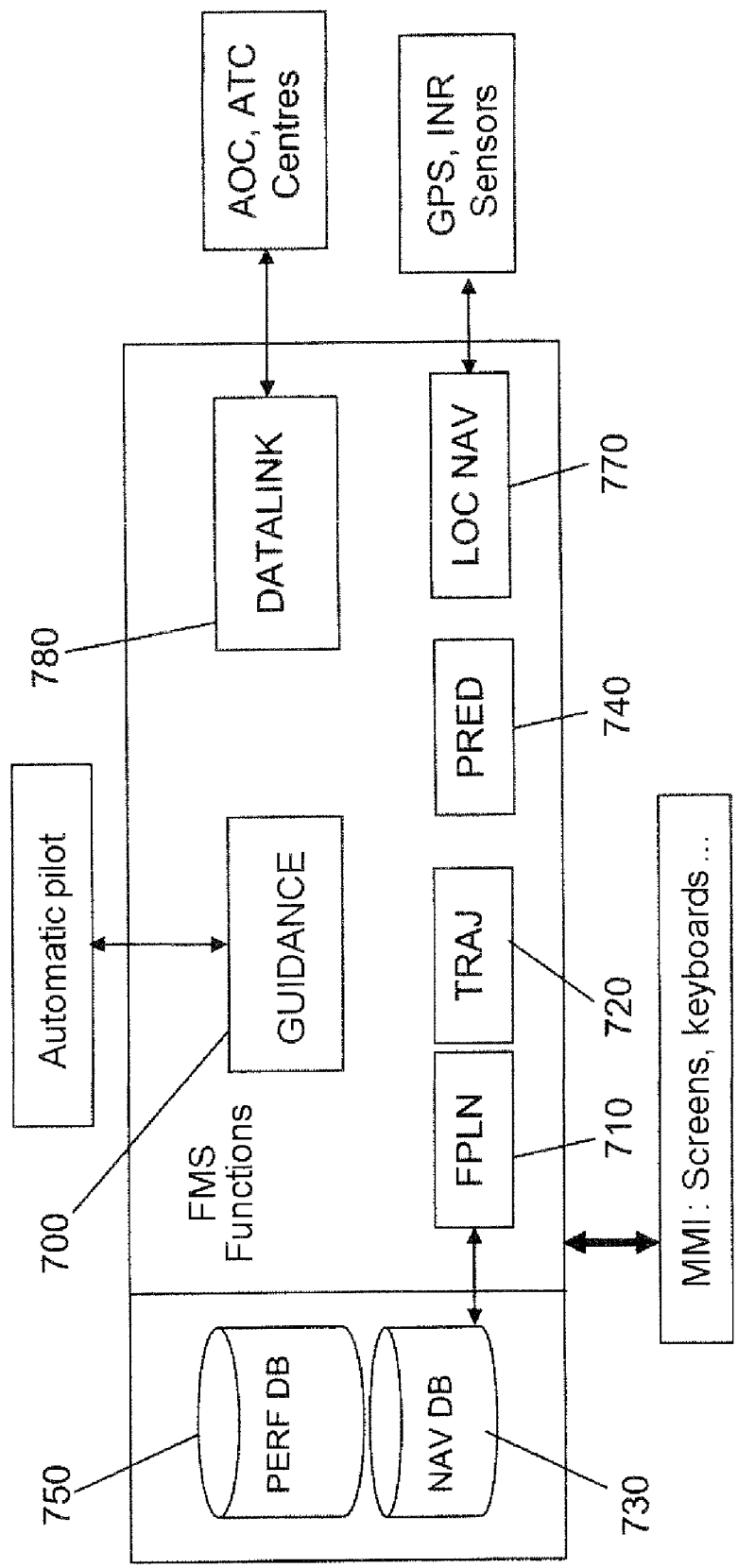

FIG. 7 illustrates an architecture of a flight management system.

DETAILED DESCRIPTION OF THE INVENTION

The abscissa axis represents true air speeds (or TAS for True AirSpeed). The ordinate axis represents altitudes in feet (or ft).

The curves of minimum air speed $V_{min}$ 301 and maximum air speed $V_{max}$ 302 of the figure correspond to a case of initial weight $GW_0$ and take account of the lightening of the aircraft weight (this is why for example the CAS parts are not ISO CAS).

The CAS and MACH setpoints, calculated with the schemes according to the known art, are limited by the envelope. Each of these limits by the envelope is calculated for a single point of the envelope. In the example, the CAS setpoint is limited by the envelope at its value at 22 000 ft to 320 knots (or kts). There exists a first margin 305 between a curve with constant CAS 304 passing through the limit point 303 and the maximum speed $V_{max}$ curve 302. This margin 305 is situated at the altitudes below the altitude of limitation by the envelope of 22 000 ft. The first margin 305 represents ranges of speeds, by altitude, flyable by the aircraft and greater than the constant CAS setpoint.

In the example, the MACH setpoint is limited by the envelope at a second point 307 corresponding to an altitude of 30 000 ft to a Mach speed of 0.70. There exists a second margin 306 between a curve with constant MACH 308 passing through the second limit point 307 and the maximum speed $V_{max}$ curve 302. The second margin 306 is situated at the altitudes below the altitude of limitation by the envelope of 30 000 ft. The second margin 306 represents ranges of speeds, by altitude, flyable by the aircraft and greater than the constant MACH setpoint.

FIG. 4 represents a temporal axis 41 along which are represented various predicted times of arrival of an aircraft at a given point. A first point RTA 42 represents a constraint to which the aircraft is subject. A second 43 and a third 44 point $ETA_{min}, ETA_{max}$ represent the earliest and latest arrival times on flying respectively according to setpoints of constant maximum and minimum speed. A fourth 45 and a fifth 46 point $ETAenv_{min}, ETAenv_{max}$ represent the earliest and latest arrival times on flying respectively according to the maximum and minimum speeds delimiting the aircraft's flight envelope. The first point 42 being situated outside of the segment formed by the second 43 and the third point 44, the aircraft is not able to comply with the time constraint by following a speed setpoint calculated with a method according to the known art. But the first point 42 being situated between the fourth 45 and the second point 43, the time constraint is greater than the earliest arrival time on flying according to the maximum speed authorized by the flight envelope. The constraint can therefore in this case be complied with by adopting an appropriate speed.

The invention relates to a method for determining the speed of an aircraft subject to a time constraint RTA. A time constraint can be expressed in the form of a fixed date at a determined point. The aircraft exhibits at least one limit speed profile, in particular: a minimum speed profile $V_{min}$ and a maximum speed profile $V_{max}$. The aircraft obeys a specific speed setpoint in a climb phase and a descent phase. The specific speed setpoint is expressed in the form of a pair of constant speeds (CAS,MACH). The aircraft comprises a flight management system making it possible to calculate a predicted arrival time ETA of the aircraft at the said point on following the speed setpoint.

In a first variant of implementation of the method according to the invention, the management system also calculates a first arrival time $ETA_{MIN}$ of the aircraft at the said point on following a pair of constant maximum speeds ($CAS_{MAX}$, $MACH_{MAX}$). The aircraft flies at the first speed $CAS_{max}$ of the pair for an altitude lying between 0 and a predefined altitude $Alt_{MAX}$, termed the crossover altitude, at the second speed $MACH_{MAX}$ of the pair for an altitude lying between the altitude $Alt_{MAX}$ and a cruising altitude.

FIG. 5 illustrates the main steps of the method according to the invention in the case of a delay in a time constraint.

The method according to the invention comprises the following steps:

the calculation 51 of a second arrival time $ETAenv_{Min}$ on flying according to the maximum speed profile $V_{max}$, this is the earliest arrival time on flying at the limits of the flight envelope, if 54 the time constraint RTA is less than the first arrival time $ETA_{Min}$ and greater than the second arrival time $ETAenv_{Min}$:

the calculation 55 of a deviation $\Delta_{ETA}$ to the time constraint:
$\Delta_{ETA}$=ETA−RTA the calculation 56 of a coefficient C as a function of the deviation $\Delta_{ETA}$ to the time constraint; according to a characteristic of the method according to the invention, the coefficient C is calculated according to the following relation:

$$C=\Delta ETA/(ETA_{MIN}-ETAenv_{MIN})$$

The coefficient C is dependent on the deviation $\Delta_{ETA}$ to the time constraint. It can be calculated according to other relations taking this deviation into account.

the calculation 57 of a first speed profile $CAS(alt_1)$ dependent on an altitude; according to a characteristic of the invention, the said first speed profile satisfies the following equation:

$$CAS(alt_1)=CAS_{MAX}+C\cdot[V_{max}(alt_1)-CAS_{max}]$$

with $alt_1$ being an altitude between 0 and the crossover altitude $Alt_{MAX}$ of the first speed pair ($CAS_{MAX}$, $MACH_{MAX}$), the calculation of a second speed profile $MACH(alt_2)$ dependent on an altitude; according to a characteristic of the invention, the said second speed profile satisfying the following equation:

$$MACH(alt_2)=MACH_{MAX}+C\cdot[V_{max}(alt_2)-MACH_{max}]$$

with $alt_2$ being an altitude lying between the crossover altitude $Alt_{MAX}$ of the first speed pair ($CAS_{MAX}$, $MACH_{MAX}$) and the cruising altitude of the aircraft;

the updating 58 of the predicted arrival time ETA by taking into account the calculated first and second speed profiles $CAS(alt_1)$ and $MACH(alt_2)$; this calculation can be performed by the flight management system;

the calculation 59 of the deviation $\Delta_{ETA}$ to the time constraint: $\Delta_{ETA}$=ETA−RTA; the predicted time ETA having been updated by taking into account the new speed setpoints, it is possible to calculate a new deviation to the time constraint, if the deviation $\Delta_{ETA}$ to the time constraint is nonzero 59, the return to the step 56 of calculating the coefficient C, otherwise the application of the calculated speed profiles to the aircraft.

According to a characteristic of the invention, if 52 the time constraint is less than the second arrival time ($ETAenv_{Min}$) then 53 the application of the maximum speed profile $V_{max}$ to the aircraft. In this case, the time constraint cannot be complied with even by flying at the limits of the aircraft's flight envelope. The effect of this method step is to limit the deviation between the actual arrival time of the aircraft and the time constraint.

According to a variant of the invention, the method according to the invention comprises, furthermore, a step of calculating a speed profile, termed the median characteristic speed profile $V_{median}$, using data of a performance base. The setpoint speed RTA (CAS and MACH) is given by a ratio between this median speed and either Vmax or Vmin. And as in the previous implementation, it is calculated along the mission as a function of the altitude and of the lightening. In this case, in the example of FIG. 5, the following are used:

When climbing, for the CAS part, a constant CAS between the initial altitude and a transition altitude situated under a first climb altitude alt1, and then a convergence towards the envelope in CAS mode. The crossover altitude is then reached in MACH mode, and a constant MACH is thereafter fixed until a second climb altitude alt2.

When descending, for the CAS part, a constant CAS between the initial altitude and a transition altitude situated under a first descent altitude alt1, and then a convergence towards the envelope in CAS mode. The crossover altitude is then reached in MACH mode, and a constant MACH is thereafter fixed until a descent altitude alt2.

This variant is therefore intermediate between the method and the state of the art, since it proposes a constant CAS/MACH pair over a part of the climb and of the descent, and a variable pair along the envelope.

The median speed is calculated as being equal to the mean of the speed profile (in terms of ground speed) arising from the first variant of the method, between the initial altitude and the transition altitude described in the variant (first altitude alt1 or second altitude alt2). It makes it possible to obtain a constant setpoint speed over an altitude range, and to make the setpoint converge towards the envelope only on the top part of the altitude range.

In a second variant of implementation of the method according to the invention, the management system calculates a first arrival time $ETA_{Max}$ of the aircraft at the said point on following a pair of constant minimum speeds ($CAS_{Min}$, $MACH_{Min}$). The aircraft flies at the speed $CAS_{Min}$ for an altitude lying between 0 and a predefined crossover altitude $Alt_{Min}$ and at the speed $MACH_{Min}$ for an altitude lying between the second altitude $Alt_{Min}$ and a cruising altitude.

FIG. 6 illustrates the main steps of the method according to the invention in the case of an advance in a time constraint.

The method according to the invention comprises the following steps:
the calculation 61 of a second arrival time $ETAenv_{Max}$ on flying according to a minimum speed profile $V_{min}$;
if 64 the time constraint RTA is greater than the first arrival time $ETA_{Max}$ and less than the second arrival time $ETAenv_{Max}$:
the calculation 65 of a deviation $\Delta_{ETA}$ to the time constraint:
$\Delta_{ETA}=RTA-ETA$
the calculation 66 of a coefficient C as a function of the deviation $\Delta_{ETA}$ to the time constraint; according to a characteristic of the method according to the invention, the coefficient C is calculated according to the following relation:

$$C=\Delta ETA/(ETAenv_{Max}-ETA_{Max})$$

the calculation 67 of a first speed profile $CAS(alt_3)$ dependent on an altitude; according to a characteristic of the invention, the said first speed profile satisfying the following equation:

$$CAS(alt_1)=CAS_{min}+C\cdot[CAS_{min}-V_{min}(alt_1)]$$

with $alt_1$ being an altitude between 0 and the predefined altitude ($Alt_{Min}$),
the calculation of a second speed profile $MACH(alt_2)$ dependent on an altitude, the said second speed profile satisfying the following equation:

$$MACH(alt_2)=MACH_{min}+C\cdot[MACH_{min}-V_{min}(alt_2)]$$

with $alt_2$ being an altitude between the predefined altitude $Alt_{Min}$ and a cruising altitude,
the updating 68 of the predicted arrival time ETA by taking into account the calculated first and second speed profiles $CAS(alt_1)$ and $MACH(alt_2)$,
the calculation 69 of the deviation $\Delta_{ETA}$ to the time constraint: $\Delta_{ETA}=RTA-ETA$
if the deviation to the arrival time $\Delta_{ETA}$ is nonzero 69, the return to the step 66 of calculating the coefficient C, otherwise the application of the calculated speed profiles to the aircraft.

According to a characteristic of the invention, if 62 the time constraint is greater than the second arrival time $ETAenv_{Max}$ then 63 the application of the minimum speed profile $V_{min}$ to the aircraft. In this case, the time constraint cannot be complied with even by flying at the limits of the flight envelope of the aircraft. The effect of this method step is to limit the deviation between the actual arrival time of the aircraft and the time constraint.

In the case where the time constraint RTA is less than the third arrival time $ETA_{Max}$ and greater than the first predicted arrival time $ETA_{MIN}$, the time constraint can be complied with by using schemes according to the known art.

According to a variant of the invention, the coefficient C is a piecewise function, dependent on the altitude or on a distance to be traversed until the end of a flight phase where the speed setpoint is applied.

According to another variant of the invention, the coefficient C is a linear function dependent on at least one of the following values: the deviation $\Delta_{ETA}$ to the time constraint, the second arrival time $ETAenv_2$, the first arrival time $ETA_1$, the altitude of the aircraft, a distance to be traversed until the end of a flight phase where the speed setpoint is applied.

FIG. 7 illustrates an architecture of a flight management system. The onboard flight management system (FMS) is the computer which determines the geometry of the 4D profile (3D+time-profile of speeds), and dispatches the guidance setpoints to the pilot or to the automatic pilot so as to follow this profile. A flight management system has the following functions described in ARINC standard 702 (Advanced Flight Management Computer System, December 1996). Such a flight management system comprises modules for:
Navigation LOCNAV, 770, for performing optimal location of the aircraft as a function of the geolocation means (GPS, GALILEO, VHF radio beacons, inertial platforms);
Flight plan FPLN, 710, for inputting the geographical elements constituting the skeleton of the route to be followed (departure and arrival procedures, waypoints, airways);
Navigation database NAVDB 730, for constructing geographical routes and procedures using data included in the bases (points, beacons, interception or altitude legs, etc.);
Performance database, PRF DB 750, containing the craft's aerodynamic and engine parameters;
Lateral trajectory TRAJ, 720: for constructing a continuous trajectory on the basis of the points of the flight plan, complying with the aircraft performance and the confinement constraints;
Predictions PRED, 740: for constructing a vertical profile optimized on the lateral trajectory;
Guidance, GUID 700, for guiding in the lateral and vertical planes the aircraft on its 3D trajectory, while optimizing the speed;
Digital datalink DATALINK, 780 for communicating with the control centres and other aircraft.

The invention also relates to a flight management system comprising means for implementing the method according to the invention in the trajectory module 720 and predictions module 740.

The invention claimed is:

1. Method for determining the speed of an aircraft that is subject to a time constraint (RTA) expressed in the form of a fixed date at a determined point, the aircraft exhibiting a limit speed profile (V.sub.limit), the aircraft comprising a flight management system calculating a predicted time of arrival (ETA) of the aircraft at the point on following a speed setpoint expressed in the form of a pair of constant speeds (CAS, MACH), the flight management system calculating, furthermore, a first arrival time (ETA.sub.1) of the aircraft at the setpoint on following a pair of constant limit speeds (CAS.sub.limit,MACH.sub.limit), the aircraft following the first speed of the pair (CAS.sub.limit) when the aircraft flies at an altitude below a predefined altitude (Alt.sub.Max), the method comprising:
  a. calculating a second arrival time (ETAenv.sub.2) according to the limit speed profile (V.sub.limit), the limit speed profile comprising a maximum speed and a minimum speed of the aircraft;
  b. calculating a deviation (.DELTA..sub.ETA) to the time constraint: .DELTA..sub.ETA=|ETA−RTA|, the deviation to the time constraint .DELTA..sub.ETA being equal to the absolute value of the difference between the predicted arrival time ETA of the aircraft at the point on following a speed setpoint and the time constraint RTA;
  c. calculating a first speed profile CAS(alt.sub.1) dependent on an altitude on the basis of the limit speed profile (V.sub.limit), with alt.sub.1 being an altitude between 0 and the predefined altitude (Alt.sub.Max);
  d. calculating a second speed profile MACH(alt.sub.2) dependent on an altitude, on the basis of the limit speed profile (V.sub.limit), with alt.sub.2 being an altitude between the predefined altitude (Alt.sub.Max) and a cruising altitude
  e. updating the predicted arrival time (ETA) by taking into account the calculated first and second speed profiles CAS(alt.sub.1) and MACH(alt.sub.2);
  f. calculating the deviation (.DELTA..sub.ETA) of the time constraint: .DELTA..sub.ETA=|ETA−RTA|, the deviation to the time constraint .DELTA..sub.ETA being equal to the absolute value of the difference between the predicted arrival time ETA of the aircraft at the setpoint on following a speed setpoint and the time constraint RTA;
  g. returning to the step of calculating the first speed profile CAS(alt.sub.1) if the deviation to the arrival time (.DELTA..sub.ETA) is nonzero, otherwise applying the calculated speed profiles to the aircraft.

2. Method for determining the speed of an aircraft according to claim 1, further comprising a step of calculating a coefficient (C) as a function of the deviation (.DELTA..sub.ETA) to the time constraint and in that if the deviation (.DELTA..sub.ETA) to the time constraint is nonzero, the return to the step (56,66) of calculating the first speed profile CAS (alt.sub.1).

3. Method for determining the speed of an aircraft according to claim 2, wherein the coefficient (C) is a piecewise function dependent on the altitude or on a distance to be traversed until the end of a flight phase where the speed setpoint is applied.

4. Method for determining the speed of an aircraft according to claim 2, wherein the coefficient (C) is a linear function dependent on at least one of the following values: the deviation (.DELTA..sub.ETA) to the time constraint, the second arrival time (ETAenv.sub.2), the first arrival time (ETA.sub.1), the altitude of the aircraft, a distance to be traversed until the end of a flight phase where the speed setpoint is applied.

5. Method for determining the speed of an aircraft according to claim 1 wherein the limit speed profile (V.sub.limit) is a maximum speed profile (V.sub.max), the first arrival time (ETA.sub.1) being an arrival time (ETA.sub.Min) of the aircraft following a pair of constant maximum speeds (CAS.sub.Max,MACH.sub.Max), the second arrival time (ETAenv.sub.2) being an arrival time (ETAenv.sub.Min) following the maximum speed profile (V.sub.Max).

6. Method for determining the speed of an aircraft according to claim 5, wherein the coefficient (C) satisfies the following equation: C=.DELTA.ETA/(ETA.sub.MIN−ETAenv.sub.MIN).

7. Method for determining the speed of an aircraft according to claim 5, wherein the first speed profile CAS(alt.sub.1) calculated (57) satisfies the following equation: CAS(alt.sub.1)=CAS.sub.MAX+C[V.sub.max(alt.sub.1)−CAS.sub.max].

8. Method for determining the speed of an aircraft according to claim 5, wherein the second speed profile MACH(alt.sub.2) calculated satisfies the following equation: MACH(alt.sub.2)=MACH.sub.MAX+C[V.sub.max(alt.sub.2)−MACH.sub.max].

9. Method for deterlining the speed of an aircraft according to claim 5, wherein the time constraint is less than the second arrival time (ETAenv.sub.Min), the application of the maximum speed profile V.sub.max to the aircraft.

10. Method for determining the speed of an aircraft according to claim 1, wherein the limit speed profile (V.sub.limit) is a minimum speed profile (V.sub.Min), the first arrival time (ETA.sub.1) being an arrival time (ETA.sub.Max) of the aircraft following a pair of constant minimum speeds (CAS.sub.Min,MACH.sub.Min), the second arrival time (ETAenv.sub.2) being an arrival time (ETAenv.sub.Max) following the minimum speed profile (V.sub.min).

11. Method for determining the speed of an aircraft according to claim 10, wherein the coefficient (C) satisfies the following equation: C=.DELTA.ETA/(ETAenv.sub.Max−ETA.sub.Max).

12. Method for determining the speed of an aircraft according to claim 10, wherein the first speed profile CAS(alt.sub.1) calculated (67) satisfies the following equation: CAS(alt.sub.1)=CAS.sub.min+C[CAS.sub.min−V.sub.min(alt.sub.1)].

13. Method for determining the speed of an aircraft according to claim 10, wherein the second speed profile MACH(alt.sub.2) calculated satisfies the following equation: MACH(alt.sub.2)=MACH.sub.min+C[MACH.sub.min−V.sub.min(alt.sub.2)].

14. Method for determining the speed of an aircraft according to claim 10, wherein the time constraint is greater than the second arrival time (ETAenv.sub.Max) the application of the minimum speed profile V.sub.min to the aircraft.

15. A flight management system of an aircraft, comprising:
  a. a module for constructing a continuous trajectory on the basis of points of a flight plan; and
  b. a module of predictions for constructing a vertical profile optimized on the trajectory;
  c. wherein the module for constructing and the module of prediction are configured to determine the speed of an aircraft that is subject to a time constraint (RTA) expressed in the form of a fixed date at a determined point, the aircraft exhibiting a limit speed profile (V.sub.limit), the aircraft comprising a flight management system calculating a predicted time of arrival (ETA) of the aircraft at the point on following a speed setpoint expressed in the form of a pair of constant speeds (CAS, MACH), the flight management system calculating, furthermore, a first arrival time (ETA.sub.1) of the aircraft at the setpoint on following a pair of constant limit speeds (CAS.sub.limit,MACH.sub.limit), the aircraft following the first speed of the pair (CAS.sub.limit) when the aircraft flies at an altitude below a predefined altitude (Alt.sub.Max) and performing the following:

i. calculating a second arrival time ($ETAenv_2$) according to the limit speed profile ($V_{limit}$), the limit speed profile comprising a maximum speed and a minimum speed of the aircraft;

ii. calculating a deviation ($\Delta_{ETA}$) to the time constraint: $\Delta_{ETA}=|ETA-RTA|$, the deviation to the time constraint $\Delta_{ETA}$ being equal to the absolute value of the difference between the predicted arrival time ETA of the aircraft at the point on following a speed setpoint and the time constraint RTA;

iii. calculating a first speed profile $CAS(alt_1)$ dependent on an altitude on the basis of the limit speed profile ($V_{limit}$), with $alt_1$ being an altitude between 0 and the predefined altitude ($Alt_{Max}$);

iv. calculating a second speed profile $MACH(alt_2)$ dependent on an altitude, on the basis of the limit speed profile ($V_{limit}$), with $alt_2$ being an altitude between the predefined altitude ($Alt_{Max}$) and a cruising altitude v. updating the predicted arrival time (ETA) by taking into account the calculated first and second speed profiles $CAS(alt_1)$ and $MACH(alt_2)$;

vi. calculating the deviation ($\Delta_{ETA}$) of the time constraint: $\Delta_{ETA}=|ETA-RTA|$, the deviation to the time constraint $\Delta_{ETA}$ being equal to the absolute value of the difference between the predicted arrival time ETA of the aircraft at the setpoint on following a speed setpoint and the time constraint RTA; and vii. returning to the step of calculating the first speed profile $CAS(alt_1)$ if the deviation to the arrival time ($\Delta_{ETA}$) is nonzero, otherwise applying the calculated speed profiles to the aircraft.

* * * * *